United States Patent
De Bell et al.

[15] 3,705,271
[45] Dec. 5, 1972

[54] AUDIO TUTORING DEVICE INCLUDING RECORDING CAPABILITY

[72] Inventors: Lawrence R. De Bell, Bethany; David D. Price, Jr., Oklahoma City, both of Okla.

[73] Assignee: Economy Co., Oklahoma City, Okla.

[22] Filed: March 26, 1971

[21] Appl. No.: 128,302

Related U.S. Application Data

[63] Continuation-in-part of Ser. No. 860,292, Sept. 23, 1969, Pat. No. 3,594,919.

[52] U.S. Cl.....179/100.2 MD, 35/35 C, 179/100.2 S
[51] Int. Cl...................G11b 23/18, G11b 27/32
[58] Field of Search...179/100.2 MD, 100.2 S, 100.2 R; 35/35 C

[56] References Cited

UNITED STATES PATENTS

| | | | |
|---|---|---|---|
| 3,269,033 | 8/1966 | Redfield et al. | 35/35 C |
| 3,587,180 | 6/1971 | Richt | 179/100.2 MD |
| 3,323,230 | 6/1967 | Cooper | 35/35 C |
| 3,084,226 | 4/1963 | Moulic, Jr. | 179/100.2 S |
| 3,405,461 | 10/1968 | Joslow | 179/100.2 S |

*Primary Examiner*—Howard W. Britton
*Assistant Examiner*—Alfred H. Eddleman
*Attorney*—Dunlap, Laney, Hessin & Dougherty

[57] ABSTRACT

Teaching machine apparatus consisting of audio record playback apparatus for reproducing plural channel record tapes including both audio information and control tone signals, and as used in combination with specialized recorder apparatus adapted for answer recording in response to played back instructional material and including interactive control means as between playback and recording circuitry during student usage. The recorder apparatus includes control tone generation means as well as switching and control circuitry for placing audio information signals and control tone signals on separate channels of the plural channel record tape, and automatic timing means provide control over control tone duration and tape transport drive energization.

5 Claims, 4 Drawing Figures

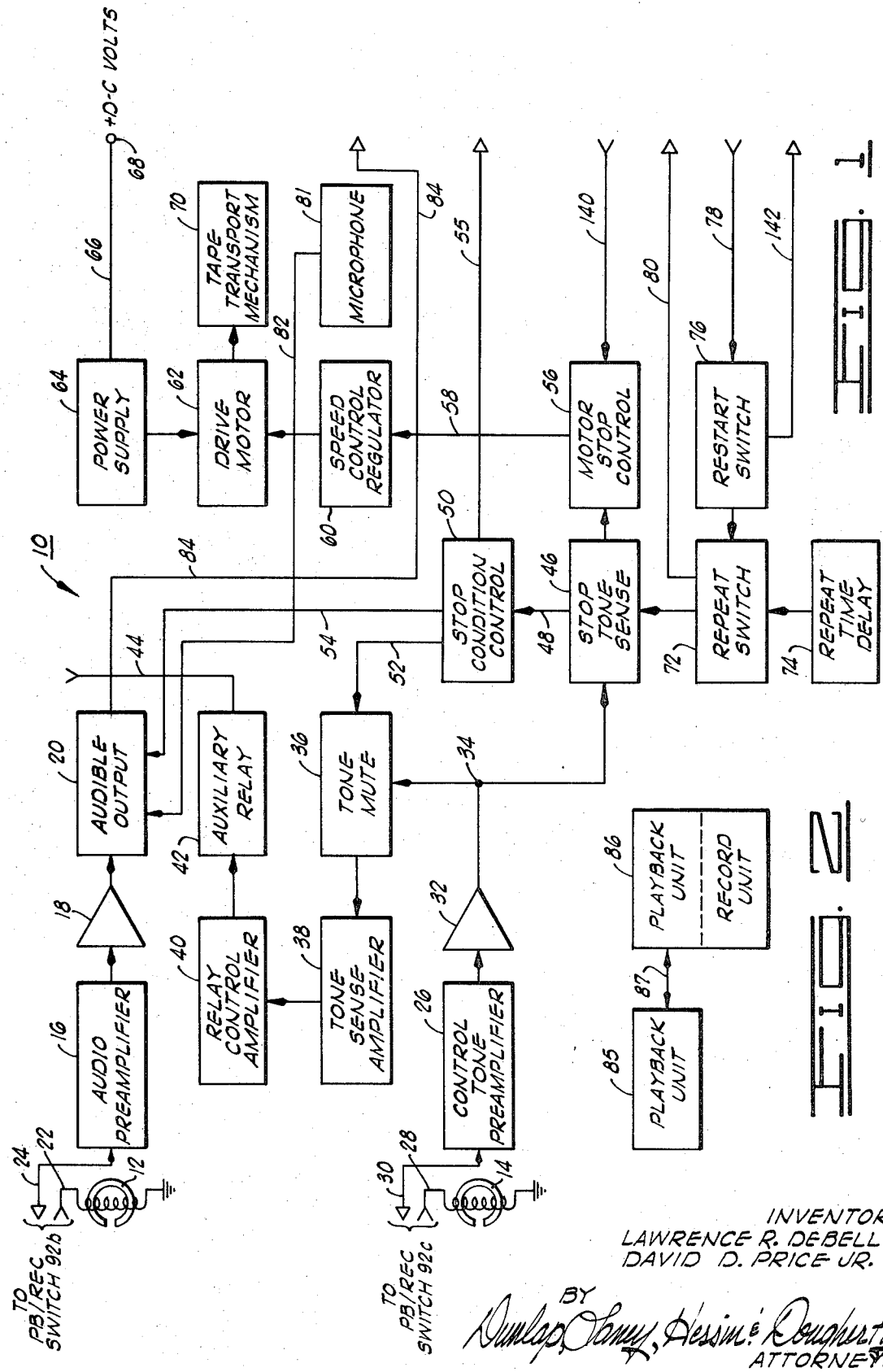

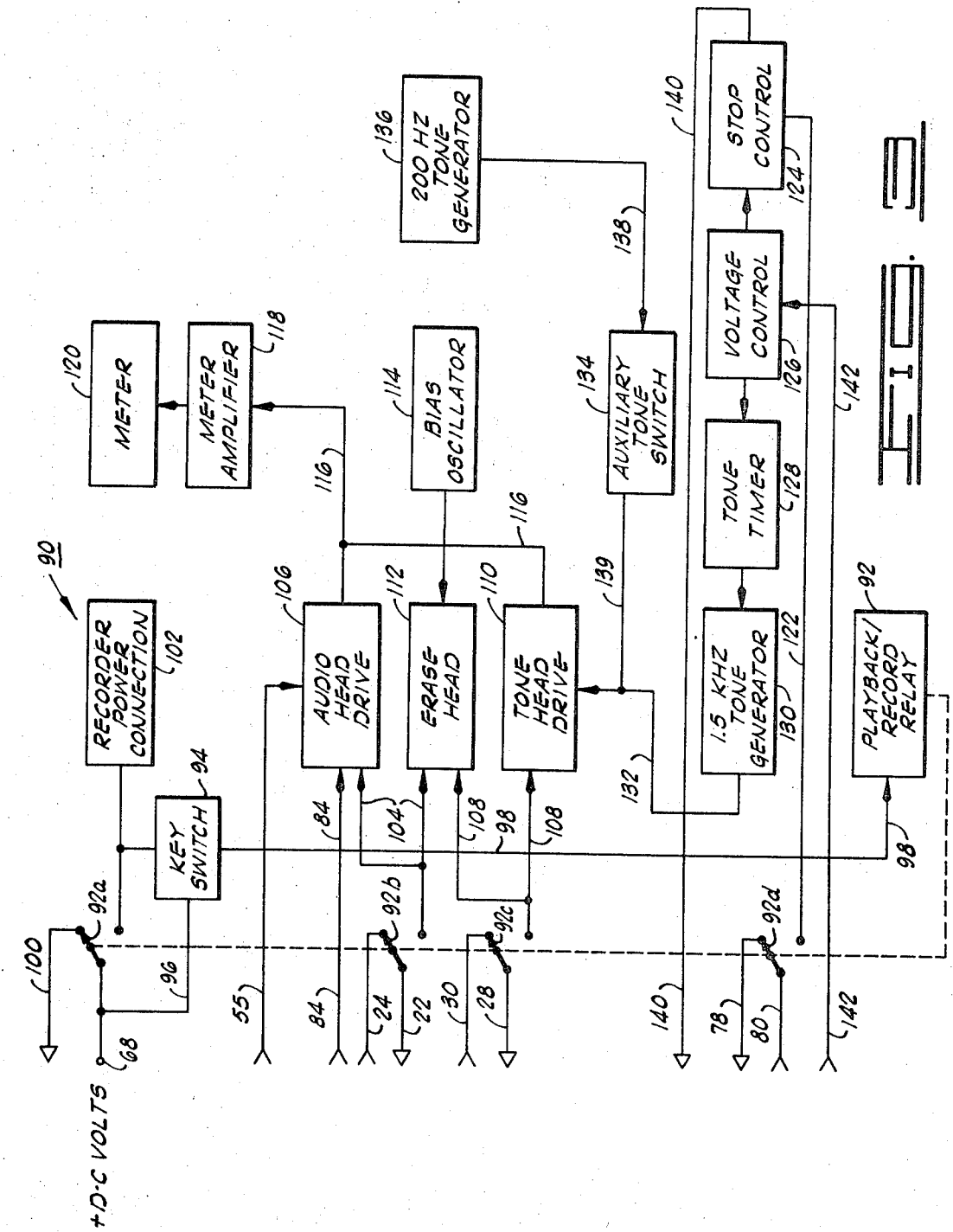

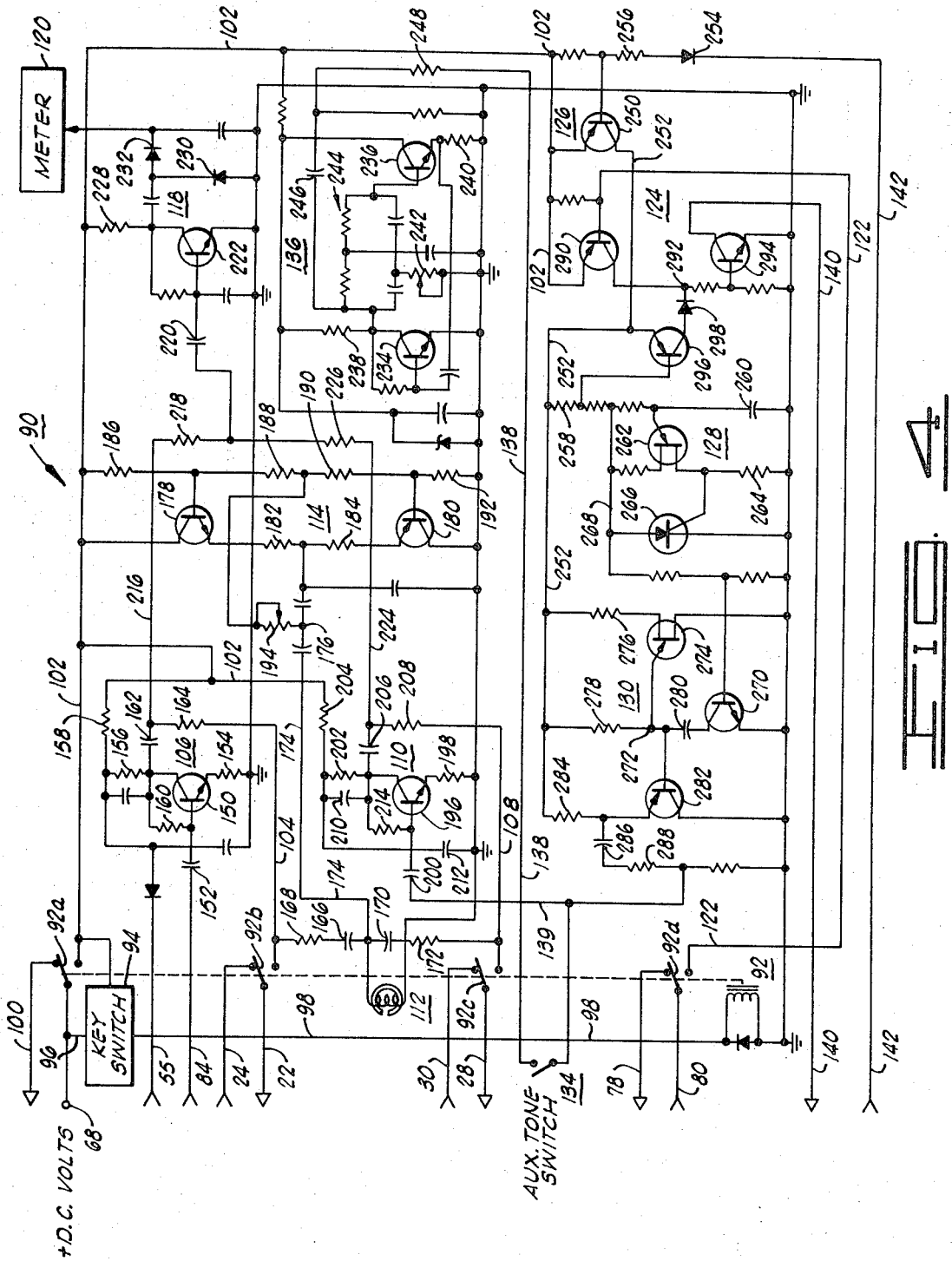

AUDIO TUTORING DEVICE INCLUDING RECORDING CAPABILITY

REFERENCE TO CO-PENDING APPLICATION

This application is a continuation-in-part application relatively to the pending U.S. application Ser. No. 860,292, now U.S. Pat. No. 3,594,919, titled "Tutoring Devices" as filed on Sept. 23, 1969 by the present inventors.

BACKGROUND OF THE INVENTION

1. Field of the Invention

The invention relates generally to teaching machines, and more particularly, but not be way of limitation, it relates to improved audio information dissemination devices characterized by automatic segment repeat facility in combination with recording control circuitry for enabling versatile playback/recording tutoring usage.

2. Description of the Prior Art

The prior art includes numerous types of teaching machines, both audio information and/or visual information disseminators. Prior types of apparatus have taken diverse forms as influenced primarily by the specific type and quantity of information being handled. Various tutoring devices have been designed in contemplation of operation with a suitable form of computer, and these mechanisms have still more characteristic structural requirements coincident with data processing demands. In general the development of such tutoring machines has responded largely to operational necessities, such as fool proof participation, reliability, low power requirements, ease of programming information, non-destructability of programmed record input, recording of student results, etc. Prior forms of apparatus have been largely concerned with either the playback or the recording phase of the audio information tutoring process, as there has apparently been but little need for development of playback-recorder systems relative to the teaching field. However, one form of prior art teaching which is deemed deserving of mention is the U.S. Pat. No. 3,405,461 filed Oct. 15, 1968 in the name of Joslow and titled "Recording-Playback System and Control Therefore," which system employed a unique form of master recorder function in concert with one or more student playback systems.

SUMMARY OF THE INVENTION

The present invention contemplates a teaching machine having both playback and recording capability and utilizing a plural channel record track wherein designated channels may be used for either control tone or audio information recording. In a more limited aspect, the invention consists of the combination of plural channel playback apparatus and plural channel recording apparatus, which recording apparatus is operable through the common transport and transducing hardware to record additional audio information as well as control tone signals, and which apparatus includes automatic timing and stop control circuitry.

Therefore, it is an object of the present invention to provide an economical teaching system having both playback and recording capability with associated control tone indicators available in any of several modes of operation.

It is also an object of the invention to provide a tutoring system capable of recording student responses to known material, such responses being intersticed with signal tones to aid an instructor or monitoring official.

It is still further an object of the present invention to provide a compact playback/recorder teaching device of light weight, high reliability and facile control which is suitable and handling by individual students.

Finally, it is an object of the present invention to provide a teaching machine in the form of a playback/recorder apparatus which is readily adaptable into any of a variety of tutorial systems, either individual or group networks.

Other objects and advantages of the invention will be evident from the following detailed description when read in conjunction with the accompanying drawings which illustrate the invention.

BRIEF DESCRIPTION OF THE DRAWING

FIG. 1 is a block diagram of the playback portion of the apparatus;

FIG. 2 is a block diagram illustrating the basic form of the playback/recorder circuit combination;

FIG. 3 is a block diagram of the recorder portion of the apparatus; and

FIG. 4 is a schematic diagram of the recorder circuitry of the apparatus as shown in FIG. 3.

DETAILED DESCRIPTION OF THE INVENTION

Referring now to FIG. 1, a playback circuit 10, as described fully in parent U.S. application Ser. No. 860,292, now U.S. Pat. No. 3,594,915, consists of an audio playback head 12 for reading out audio information from a first channel of tape record, and a control tone playback head 14 for reading out control tone signal as recorded on an adjacent channel of record track. Audio information signals from playback head 12 are applied to an audio preamplifier assembly 16 for further amplification in amplifier 18 for final output through audible output stage 20, i.e. loud speaker, head phones or such. The interconnection from playback head 12 includes both of leads 22 and 24 as they are applied separately to a playback/record relay (as will be further described below).

In like manner, the control tone playback head 14 is applied to a control tone preamplifier 26 with the aid of proper switching of leads 28 and 30 at the playback/record relay, to be further described. The output from control tone preamplifier 26 is then applied through a conventional form of signal amplifier 32 where the amplifier control tone signal is available at junction point 34. In some applications, as is set forth in the above referenced copending application, the system utilizes both a control tone signal and an auxiliary tone signal for controlling ancillary or additional equipment such as visual indicators and the like. In this event, both the control tone signal, e.g., 1500 hertz and a selected auxiliary tone signal, e.g., 200 hertz, are amplified and present at the junction point 34, whereupon signal input from junction point 34 to a tone mute stage 36 provides selective amplification of the auxiliary tone signal for input to a tone sense amplifier 38. The amplified 200 hertz tone signal is then applied to a relay control amplifier 40 which, in turn, conducts output to energize an auxiliary relay 42 to provide energization at an output jack 44 thereby to control operation of whatever the additional or auxiliary device being used with the playback circuitry 10.

The amplified tone signal from junction point 34 is also applied to a stop tone sense stage 46, an amplifier stage, which provides various outputs in response to the 1,500 hertz signal presence. The stop tone sense stage 46 provides a first output via line 48 to a stop condition control stage 50 which is responsive to provide outputs via lines 52 and 54 to the tone mute 36 and audible output stage 20, respectively. The output on line 52 conveys a voltage change in response to conduction of stop condition control stage 50 to disable conduction of the auxiliary tone signal through tone mute stage 36. Similarly, output on lead 54 to audible output 20 for the purpose of enabling an associated boom microphone, not specifically shown. A third output from stop tone sense stage 46 is applied to motor stop control stage 56 which, when cut off, provides voltage output via lead 58 to speed control regulator stage 60 to stop energization of the D-C drive motor 62.

The D-C drive motor 62 receives energizing voltage from a conventional type of power supply 64 which also provides output via line 66 and output terminal 68 to the recorder circuitry, as will be further described below. The drive motor 62 is coupled in conventional manner to a well-known type of tape transport mechanism 70 which includes the various tape drive, tape take up, idler and tensioning hardware, etc. The tape transport mechanism 70 maintains the plural channel record track in operative alignment with each of playback heads 12 and 14.

A repeat switch 72 may be actuated to effect rewind and replay of a predetermined time-length of the record tape. Thus, a repeat time delay stage 74 controls the amount of rewind time as it operates through repeat switch 72 which controls motor stop and reverse conditions through stop tone sense stage 46. A restart switch 76 provides reset of all conditions to the start capability, and an additional input via line 78 from the recorder section, provides reset to the restart condition whenever the repeat switch functions via line 80 through the recorder circuitry, as will be further described. A microphone 81 provides output on lead 82 to audible output 20, and microphone output 84 is then available to the recorder circuitry.

The circuitry shown in block form in FIG. 1 is shown as described in more particular detail in the afore-mentioned U.S. patent application of the same inventors, and the present invention resides in the further incorporation of and coaction with recorder circuitry as shown in FIGS. 3 and 4, as it is combined with the playback circuitry and tape drive system. Thus, as shown in FIG. 2, a playback unit 85 can function alone or in operative interconnection via a line 87 with a combination playback/recorder unit 86. The playback portion of unit 86 would be essentially the same as playback unit 85.

Referring now to FIG. 3, the recorder circuitry 90 is controlled by a playback/record relay 92 which controls actuation of each of relay contacts 92a, 92b, 92c and 92d to switch between the playback and record functions. A key switch 94 which may be located on the front panel receives D-C energy from the D-C voltage supply terminal 68 and lead 96, and the key switch 94 effects energization via line 98 to playback/record relay 92 whereupon each of relay contacts 92a through 92d is switched to the record position. Thus, contact 92a switches the D-C energizing voltage from a return lead 100 energizing the playback circuitry to the recorder power supply 102 to energize the various stages of the recorder circuitry 90. The contact 92b removes the audio information playback head 12 and lead 22 from connection with return lead 24 and connects to an input lead 104 which conducts audio output from audio head drive 106. The audio head drive 106 receives input from the amplified microphone input via lead 84.

The relay contact 92c provides a similar function with respect to control tone information. That is, control tone lead 28 connected to playback/record head 14 is switched from playback lead 30 to a lead 108 which receives control tone signal input from a tone head drive amplifier 110. Each of leads 104 and 108 are also connected to erase head 112 which is located physically in advance of the audio and tone playback/record heads 12 and 14, and which receives a constant frequency input from a suitable form of bias oscillator 114. One type of bias oscillator 114 which has been found to operate to good advantage is a complementary oscillator functioning at about 60 kilohertz. An output is also taken from each of audio head drive 106 and tone head drive 110 via lead 116 for input to a meter amplifier 118 whose output is applied to energize a conventional form of recording meter 120.

The relay contact 92d provides removal of a stop condition signal, as input via lead 80 from playback circuitry 14, from a restart connector lead 78 to a lead 122 which energizes a stop control stage 124. The output from stop control stage 124 is then applied via lead 140 back to playback circuitry 10 as a motor control actuation. A voltage control stage 126 is responsive to input on lead 142 to control energization of both a tone timer 128 and tone generator 130. Tone generator 130 provides an output via lead 132 to tone head drive 110. An auxiliary tone switch 132 is actuated to select an additional auxiliary tone from tone generator 136 and lead 138 for inclusion on input lead 139 to tone head drive 110. Thus, in the case where an auxiliary device is in use, both the 200 and 1,500 hertz signals will be included for recording though tone head drive 110 and the associated control tone recording circuitry. The stop control 124 provides stop output via lead 140 for conduction back to the playback circuitry 10 to control motor stop control circuit 56 in accordance with conditions set by the recorder circuitry 90.

The recorder circuitry 90 is shown in greater detail in FIG. 4. Thus, the audio head drive stage 106 comprises an NPN transistor 150 which receives audio information signal input on lead 84 via coupling capacitor 152 to the base thereof. The emitter of transistor 150 is connected through a resistor 154 to ground while the collector is connected through resistors 156 and 158 to the plus D-C volts power supply lead 102. The collector is biased from the base by means of a resistor 160 and an output is taken from the collector through a capacitor 162 and resistor 164 for conduction via lead 104 to the playback/record switch contact 92b. A positive voltage present on lead 55, provides power to the stop condition control stage 50 of FIG. 1 which in turn activates a portion of audible output stage 20 to facilitate amplification of the microphone input as derived from microphone 81 (FIG. 1) and which is simply re-routed back via lead 84 to the audio head drive 106.

An erase head 112 provides the resonant tuning element for bias oscillator 114 and therefore has the highest level of bias signal impressed across it. Thus, erase head 112 is considered the source of bias and is connected via a capacitor 166 and resistor 168 to the audio information signal output lead 104 and, similarly, it is connected through a capacitor 170 and resistor 172 to the control tone output lead 108. Input of bias energy to erase head 112 is applied via lead 174 which receives bias oscillation energy, e.g., 60 kilohertz, as present at junction point 176 of bias oscillator 114. The bias oscillator 114 consists of a pair of transistors, an NPN transistor 178 and a PNP transistor 180 operating in complement with respective emitters connected through resistor 182 and 184 to the output junction point 176. The collectors are connected to the plus D-C volts supply lead 102 and ground, respectively, while the bases are coupled in balanced manner across a voltage divider network consisting of resistors 186, 188, 190 and 192. A potentiometer 194 provides balance control as between the complementing transistor stages making up the bias oscillator 114.

The tone head drive stage 110 is made up in the same manner as audio head drive 106 in that it consists of an NPN transistor 196 connected common emitter through a resistor 198, with input signal being received from lead 139 from auxiliary tone switch 134 through a capacitor 200 to the base of transistor 196. The collector is connected through resistors 202 and 204 to supply lead 102 and output is taken through a capacitor 206 and resistor 208 to the control tone output lead 108 for application to relay contacts 92c of the playback/record relay 92. Filter capacitors 210 and 212 provide decoupling and transient suppression while a resistor 214 provides base-collector D-C bias.

A meter amplifier stage 118 monitors each of the audio head drive stage 106 and tone head drive 110 for output on meter 120. Thus, audio information signal is conducted via lead 216 and resistor 218 for input through a coupling capacitor 220 to the base of an NPN transistor 222, the meter amplifier stage 118. Similarly, output from output capacitor 206 of tone head drive stage 110 is applied via lead 224 through a resistor 226 for input in similar manner. The transistor amplifier stage is a generally conventional type of circuit as the transistor 222 is connected common-emitter to ground with the collector connected through a load resistor 228 to the positive voltage supply lead 102. An output is taken from the collector of transistor 222 and rectified by means of rectifiers 230 and 232 to provide drive to the meter 120, a conventional voltage meter.

The auxiliary control tone generator 136 serves to provide an auxiliary control tone when necessary, as controlled by auxiliary tone switch 134, and such auxiliary control tone is a low frequency tone of non-interfering nature, e.g., 200 hertz. The generator 136 is a conventional form of transistor oscillator known as a parallel Tee oscillator and it consists of a pair of NPN transistors 234 and 236, with transistor 234 operating as an oscillator and transistor 236 operating as an emitter follower providing feedback. Thus, transistor 234 is biased through a load resistor 238 in the collector circuit while transistor 236 is direct coupled thru the parallel Tee bridge 244 to the collector of transistor 234, and has a load resistor 240 in the emitter circuit to ground. Frequency adjustment is enabled by potentiometer 242 connected to resistance-capacitance network 244 ad interconnected between the collector of transistors 234 and the base of transistor 236. Output from the oscillator stage is taken from the collector of transistor 234 through a coupling capacitor 246 and resistor 248 to the output lead 138 and auxiliary tone switch 134.

Referring now to stop control circuit stage 124, a PNP transistor 250 is connected to provide a switching function with its emitter connected to the plus voltage supply lead 102 and collector connected to a lead 252 which, when energized, provides supply voltage for the tone generation and timing circuitry as will be further described. Thus, the base of transistor 250 is turned on by receipt of a sufficiently negative voltage through diode 254 and resistor 256 from lead 142 from restart switch 76 (FIG. 1) in the playback circuit 10. Conduction of transistor 250 then places supply voltage on lead 252 to energize the tone timing and generation circuitry.

The tone generator 130 is turned on in response to conduction of PNP transistor 250 to place positive supply voltage on lead 252. Tone generator 130 consists of a uni-junction transistor 274 having base $B_1$ connected directly to ground and base $B_2$ connected through a load resistor 276 to the voltage supply lead 252. The emitter is connected to junction point 272 which charges up repeatedly in response to charge through a resistor 278 charging capacitor 280 to cause repeated firing and discharge through uni-junction transistor 274 to generate a repetitive voltage change or relaxation oscillation as present on the base of a PNP transistor 282. Transistor 282 is connected as a shaping amplifier with the emitter connected through load resistance 284 to supply lead 252, and an oscilliatory voltage or control tone signal is taken off through a coupling capacitor 286 and resistor 288 to the control tone input lead 139 to tone head drive stage 110.

The oscillatory conduction taken off of junction point 272 and capacitor 280 ceases upon stopping conduction in NPN transistor 270; that is, after a sufficient time the charge is built up on capacitor 260 to fire the uni-junction timing transistor 262 causing conduction of a silicon controlled rectifier 266 thereby effectively placing the base of transistor 270 at ground potential to cut off conduction.

The motor stop control stage 124 is responsive to voltage level change via input lead 80 through relay contact 92d and lead 122 to the base of a PNP transistor 290 connected common-emitter to voltage supply lead 102 and conductive in response to negative going voltage. Conduction of transistor 290 causes an increase in the voltage at a junction point 292 and the base of a common-emitter connected NPN transistor 294 such that it too conducts and shunts motor control lead 140 to ground thereby activating the motor stop control stage 56 (See FIG. 1) in the playback circuitry 10. A PNP transistor 296 is connected common-emitter to the auxiliary positive voltage supply lead 252 with the collector connected through a rectifier 298 to junction point 292 such that the motor control transistor 294 is caused to conduct when silicon controlled rectifier 266 is energized, i.e., when voltage control transistor 250 is energized i.e., when voltage control transistor 250 is energized to apply the positive supply of voltage on auxiliary supply lead 252, and unijunction transistor 262 triggers silicon controlled rectifier 266 after time delay determined by timer 128.

OPERATION

As previously stated, the playback circuitry 10 is capable of individual operation as individual playback units may be distributed to each student of a group for independent study of audio information as generally provided in cassette form with or without attendant visual aids. The operation of the individual playback units for paced audio information instruction is fully set forth in the aforementioned U.S. patent application Ser. No. 860,292, the designated parent patent application.

Operation utilizing the present invention combines the additional capability of recording audio information and selected tone generation for construction of individualized or specialized tape programs, as well as the additional facility of recording student responses is selected order as delineated by intersticial tone signal recordings. Thus, circuitry constructed in accordance with the present invention includes both the playback circuitry 10 and the recorder circuitry 90 as a complete unit or operative entity, and either or both of the above functions may then be carried out. A student may use the integrated playback/recorder unit not only for studying pre-recorded information programs but for constructing his own information programs for later study or use by others. A teacher or group monitor may utilize a playback/recorder unit in conjunction with a group of students each of whom has an individual playback unit, and the playback/recorder unit then functions as a scoring or response recording apparatus.

In order to record program material, the playback/record relay 92 is energized to the record position (i.e., other than shown). The instructor or other originating operator may then input selected audio information through microphone 81 and lead 84 to the audio head drive 106 whereupon it is amplified and output via lead 104, relay contact 92b and lead 22 to the audio information transducer 12.

Upon completion of the instant information segment, the recording operator punches a front panel button switch (not specifically shown) which then activates the 1.5 kilohertz control tone generator 130 to provide output via auxiliary tone switch 134 to the tone head drive 110, which amplified output is applied via lead 108 through a relay contact 92c and lead 28 to the control tone transducer 14. The tone generation output will persist as long as tone timer 128 dictates, an adjustable feature, whereupon it controls cessation of output from tone generator 130. Thus, the transducers 12 and 14 are each maintained in contact with selected channels of a recording track, and the channels are previously cleaned up by an erase head 112 preceding, erase head 112 being energized in response to output of the bias oscillator 114.

Tapes formed in accordance with the operation as set forth above may then be utilized in the playback circuits, i.e., units consisting of that circuitry of FIG. 1 which is the subject matter of the parent U.S. patent application Ser. No. 860,292 as aforementioned. Such information segments as prepared by the monitoring operator might only constitute fill-in information not specifically covered by a particular lesson program, and useful, only in particular circumstances as to students or learning capabilities. On the other hand, it may be desirable to record an entire set of individual lesson tapes for specialized information not otherwise available on the pre-programmed series offerings.

In accordance with an alternative mode of use, the playback/ recorder unit, consisting of playback circuitry 10 in combination with recording circuitry 90, may be utilized by the teacher or instructional monitor as a student response recording mechanism in communication with selected students having access to a playback unit, i.e., the structure of FIG. 1. A five conductor patchcord from the student unit to the monitor's playback/recorder unit will enable such lesson response recording operation. Thus, the student's playback unit 85 (FIG. 2) is interconnected to maintain recording control over a monitor's playback/recorder unit 86 so that his response to an information segment is recorded via his own microphone 81 for input to the input lead 84 of record circuitry 90 at the monitor/operator's playback/record unit 86. The input lead 84 then amplifies the student response and audio head drive 106 for amplified output via lead 104 and relay contact 92b so that the response is recorded on transducer 12 at the monitor's playback/record unit 86. At the cessation of the student's response, the student presses the retract switch 76 to initiate a pulse via lead 142 through voltage control 126 so that the tone generator 130 initiates an output for a time as set by tone timer 128, and the control tone is applied through tone switch 134, tone head drive 110 and relay contact 92c to the tone channel transducer 14. At the end of this timed tone recording, the drive motor in the monitor's playback/record unit 86 will stop, so that recording will cease until such time as the student's playback unit 85 again stops in response to a stop control tone contained in the lesson tape being played. At this time transistors 290 and 294 cease to conduct and the drive motor of recorder unit 86 is allowed to run again. The monitor then has student responses intersticed by control tone segments for given lesson segments.

Other visual aids may be utilized in conjunction with the learning program by utilizing the auxiliary tone generator and auxiliary tone switch 134 in conjunction with the external visual aid equipment. Thus, take for example the case of a slide projector used in conjunction with the audio information record; a given record segment may require a predetermined slide projection, and a series of such segments would require switching of slide information at specific points. This can be accomplished by recording the 200 hertz tone signal by setting auxiliary tone switch 134 to include such 200 hertz tone for input through tone head drive 110 to the tone transducer 14. Then during playback of the record, detection of the 200 hertz tone would actuate the tone sense amplifier 38 and auxiliary relay 42 to actuate the associated slide projection mechanism to institute a slide change. Many other types of auxiliary aid or accessory may be controlled synchronously in accordance with the practice of utilizing the auxiliary tone circuitry.

The foregoing discloses a novel teaching machine of a type which includes both playback and recording capability so that the operational uses of the mechanism are greatly enlarged and especially enhanced as regards independent study and recording usage. A playback/recorder unit as constructed in accordance with the present invention may be used not only as a individual student's instrument but also as a student monitor's apparatus as tied electronically to other units of same or similar circuit configuration. No similar apparatus has been evolved which can compare in versatility of operation, simplicity or economy of construction and reliable operation. It is contemplated that a variety of usages shall evolve, such applications including independent use as well as associated operation with other accessory instruments, and the equipment is susceptible of varied application through patchcord interconnection to other devices.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. In combination with a teaching machine of the type which reproduces selected audible information, said teaching means including tape transport means, D-C power supply means, tape drive means, audio playback and record means, audio reproducing means, control tone playback and record means, control tone control circuitry, and a plural channel tape record for receiving both audio and control tone signal recorded thereon, recording apparatus in integral association with said teaching machine, comprising:

switching means energizable to switch said audio and control tone playback and record means to a record mode to receive respective audio and control tone signals as input to said respective audio and control tone playback and record means for recording on said teaching machine tape record;

audio means, including an audio head drive stage for transducing audible energy and amplifying said transduced energy to provide said audio signal input;

tone generator means including a tone head driver stage for providing said control tone signal input;

second switching means actuatable to energize said tone generator means;

timing means connected to cease energization of said tone generator means after a predetermined duration, said timing means also providing a motor stop output simultaneous with the ceasing of energization of the tone generator means; and motor control circuitry responsive to said motor stop output to de-energize said tape drive means.

2. Recording apparatus as set forth in claim 1 which is further characterized to include:

auxiliary tone generator means providing a constant frequency auxiliary control tone output at a selected low frequency which does not interfere with said control tone signal; and auxiliary tone switch means receiving said control tone signal from said tone generator means and said auxiliary tone generator means to provide a selected output to said tone head driver stage, said selected output consisting of either the control tone signal or the control tone and auxiliary control tone signals.

3. Recording apparatus as set forth in claim 1 wherein said tone generator means comprises:

reactance means connected to said D-C power supply means and being normally de-energized to provide no voltage output on an auxiliary power supply lead;

actuation means generating a pulse input to said reactance means to cause said reactance means to conduct and provide voltage output on said auxiliary power supply lead; and relaxation oscillator means connected to said auxiliary power supply lead and energized in response to voltage output applied thereon to generate said control tone signal output.

4. Recording apparatus as set forth in claim 3 wherein said timing means comprises:

resistance - capacitance means connected to said power supply lead to charge at a pre-determined rate upon energization thereof; and second reactance means energized by said resistance - capacitance means to disable said relaxation oscillator means.

5. Recording apparatus as set forth in claim 4 which is further characterized to include:

auxiliary tone generator means providing a constant frequency auxiliary control tone output at a selected low frequency which does not interfere with said control tone signal; and auxiliary tone switch means receiving said control tone signal from said tone generator means and said auxiliary control tone output from the auxiliary tone generator means to provide a selected output to said tone head driver stage, said selected output consisting of either the control tone signal or the control tone and auxiliary control tone signals.

* * * * *